United States Patent [19]
Whitford

[11] Patent Number: 5,028,002
[45] Date of Patent: Jul. 2, 1991

[54] CROSS-FLOW SPRAY ASSEMBLY

[75] Inventor: Darryl R. Whitford, Rosedale, Australia

[73] Assignee: DRW Engineering Pty. Ltd., Rosedale, Australia

[21] Appl. No.: 370,347

[22] Filed: Jun. 22, 1989

[30] Foreign Application Priority Data

Sep. 5, 1988 [AU] Australia ............................... PJ0211

[51] Int. Cl.⁵ .......................... B05B 1/28; B05B 15/04
[52] U.S. Cl. ......................................... 239/8; 239/77;
  239/120; 239/124; 47/1.7
[58] Field of Search ............... 239/120, 124, 164, 172, 239/288, 8, 77; 47/1.7

[56] References Cited

U.S. PATENT DOCUMENTS

| 3,088,676 | 5/1963 | Nottingham | 239/172 X |
|---|---|---|---|
| 3,092,327 | 6/1963 | Fish | 239/124 X |
| 3,584,787 | 6/1971 | Thomason | 239/164 X |
| 3,861,594 | 1/1975 | Wendling | 239/124 X |
| 4,274,589 | 6/1981 | Jones | 47/1.7 X |
| 4,857,367 | 8/1989 | Thorn et al. | 239/124 X |

FOREIGN PATENT DOCUMENTS 2606672  5/1988  France ................. 239/288

Primary Examiner—Andres Kashnikow
Assistant Examiner—William Grant
Attorney, Agent, or Firm—Rodman & Rodman

[57] ABSTRACT

A cross-flow spraying method comprising creating an air stream by a fan, spraying a crop with a spray liquid injected into the air stream and passing the spray airborne by the air stream across the crop, receiving some at least of airborne overspray in a suction hood located at the lee side of the crop and recirculating the spray liquid. The air outlet from the suction hood may be redirected to the inlet side of the fan, or the suction hood may have its own exhaust fan, and surfaces which precipitate the spray liquid. By utilizing suction as well as pressure, the leaves of vegetation flutter and become more fully covered with the spray liquid. Loss of liquid due to overspray is reduced.

15 Claims, 6 Drawing Sheets

CROSS-FLOW SPRAY ASSEMBLY

This invention relates to a spray assembly which has a cross-flow and return characteristic, and to a method of spraying a crop with an agricultural liquid spray.

BACKGROUND OF THE INVENTION

It is well known that application of chemical sprays to many agricultural and horticultural crops results in a serious loss of expensive chemicals, and this in turn results in a chemical contamination of the environment which is sometimes regarded as a major problem.

With spray patterns which have been developed for the spraying of vineyards, orchards, and other crops such as lettuces, there has quite often been a loss of between 60% and 80% of the applied spray volume which fails to adhere to the foliage. This is particularly true of air-mist sprayers where a high velocity is used to promote spreading of the spray throughout the foliage. Overspray often results in large clouds of spray mist being released into the atmosphere and being able to drift onto open ground, into houses and in other ways cause chemical contamination.

However in order to create adequate foliage cover, a considerable velocity is applied to the droplets of spray, and this renders difficult the containing of any spray. This is true both for air-mist or direct spray mist jets, and also to electrostatic spraying although the latter is obviously more efficient.

This invention relates to improvements in spraying of crops in general, and is particularly useful in the spraying of grape vines, pome and citrus trees. Grape vines require repeated spray applications once the shoots are approximately 10 cm long. A trellised vine at that stage comprises foliage along the lateral canes, with the greater amount near the trunk area. The height of the trellis above the ground is usually constant, but the ground often undulates due to contoured vineyards. It is therefore quite difficult to achieve a spray pattern which is adequate for the canes and which will also cover the trunk area, and be able to accommodate varying heights. It is in such circumstances that one can expect as much as 80% loss.

When pome or citrus trees are subjected to pressure spray only, the leaves usually close against one another, and inhibit penetration of spray into the tree. Applying a suction on the lee side of the tree causes leaf flutter in a manner which greatly improves spray coverage.

PRIOR ART

The closest prior art known to the Applicant is the Australian patent specification 50424/79 in the names of Moore and Dawson wherein "solid stream" spray nozzles directed spray to a collector from which the spray liquid was recirculated. There was no disclosure of an air stream, nor of a suction device on the collector which would have the effect of causing leaf flutter.

BRIEF SUMMARY OF THE INVENTION

The main object of this invention is to provide an improvement whereby the loss of chemical spray is largely reduced and leaf coverage is improved, and in an embodiment of the invention a method comprises spraying a crop With spray liquid injected into the air stream and passing the spray airborne by the air stream across the crop, receiving some at least of airborne overspray in a suction hood located at the lee side of the crop and recirculating the liquid.

With this method, a saving of as much as 50% can be achieved in some circumstances, when compared with the air-mist type spraying, and the "leaf flutter" results in an improved penetration of spray. Overspray liquid precipitates in the hood, and only a small amount is discharged therefrom. Even that small amount is recovered if the air stream is recirculated back to the fan.

The invention further includes a device for cross-flow spraying, the device comprising a wheeled carriage carrying on it a fan which directs a flow of air past a spray jet or jets, the air being directed to a suction hood laterally spaced from the spray jets, and the suction hood having a sump and recirculating means, so that airborne overspray which is precipitated in the hood is recirculated through the spray jets.

More specifically, the method of the invention comprises creating an air stream with a fan, injecting an agricultural liquid spray into the air stream, passing the spray airborne by the air stream across the crop in such manner that some of the spray adheres to foliage of the crop, establishing a low pressure in a suction hood at the lee side of the sprayed crop, receiving some at least of airborne overspray in that suction hood, precipitating some of that received overspray liquid in the hood, and recirculating that liquid to injection into the air stream.

The means of the invention comprises a support frame, a reservoir on the frame, fan drive means and a fan coupled for drive thereto both on the support frame, air flow directing means between an outlet side of the fan and a discharge end in a position to discharge an air stream created by the fan over a crop, at least one spray jet in a position to inject spray into the air stream, a pump and conduit means between the reservoir and spray jet, a suction hood, support means supporting the suction hood from the support frame in a position to receive overspray which does not adhere to foliage of the crop, means to create an air flow into the suction hood, a sump in the suction hood, and pump and conduit means arranged to recirculate spray liquid from the hood to the reservoir.

BRIEF DESCRIPTION OF THE DRAWINGS

An embodiment of the invention is described hereunder in some detail with reference to, and as illustrated in, the accompanying drawings.

Figure 1:
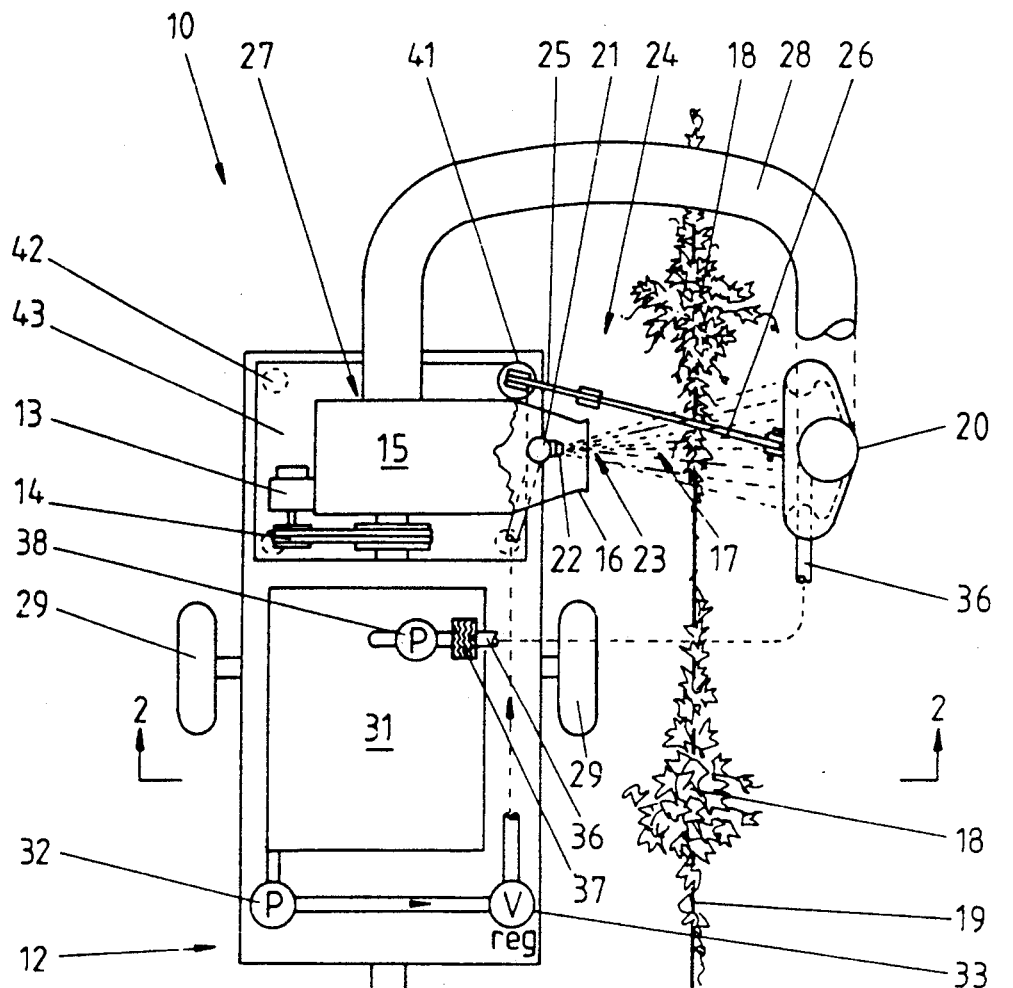
FIG. 1 is a plan view of the machine in a very simple form such as would be used for spraying grape vines in a vineyard.
Figure 2:
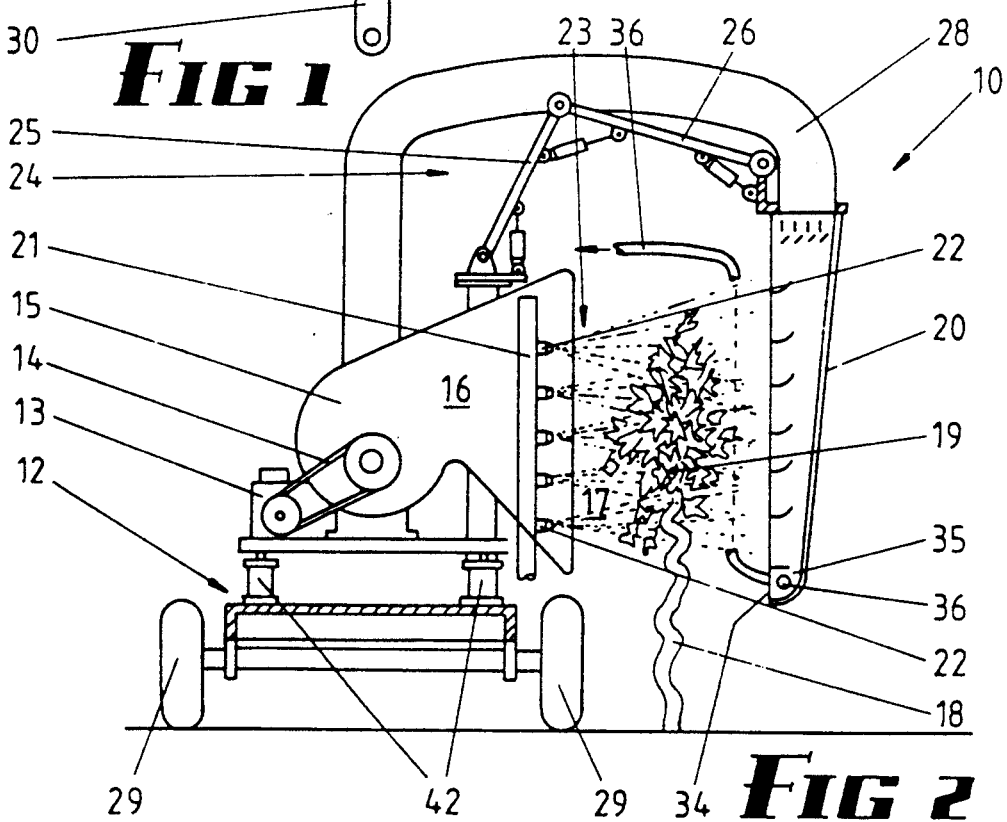
FIG. 2 is a section taken on line 2-2 of FIG. 1 (but excluding a spray reservoir tank)

In the embodiment of FIGS. 1 to 4, a cross-flow spray assembly 10 (FIGS. 1 and 2) or 11 (FIG. 3) comprises a wheeled carriage 12 supporting a drive engine 13 coupled by V-belts 14 to a fan 15 of the centrifugal type, the fan 15 having at its discharge end a discharge hood 16 which is in a position to discharge an air stream 17, when created by the fan, over a crop which in FIGS. 1 and 2 comprises a row of grape vines 18 carried on a trellis 19, to a suction hood 20. Discharge hood 16 contains a distribution tube 21 having a plurality of discharge jets 22 directing a liquid agricultural spray 23 into the air stream 17 so that the spray droplets become airborne. The droplet size is larger than in prior art mist sprays, desirably between 300 and 1000 microns, to more effectively cover leaf surfaces.

A support arm assembly 24 provides both height and lateral adjustment for position of the suction hood 20 which is supported thereby, the assembly 24 comprising fully articulated hydraulically operated arm portions 25 and 26. Hood 20 is positioned as shown best in FIGS. 1 and 2 for receiving overspray which does not adhere to the foliage of the crop 18. The suction hood 20 is connected back to the inlet side 27 of the fan 15 by recirculating duct 28. Therefore, any overspray contained in the air stream created by the fan 15 is recirculated, and in most instances with very little loss.

The wheeled carriage 12 is provided with support wheels 29 (not shown in FIG. 3) and a tow bar 30 by which it can be towed through a vineyard or other agricultural area. A reservoir tank 31 (not shown in FIG. 2) on carriage 12 carries the liquid agricultural spray, and this spray is pumped by pump 32 (FIG. 1) through regulating valve 33 into the distribution tube 21 for discharge through the jets 22. The lower portion of the suction hood 20 has an upstanding wall 34 to provide a small sump 35 which collects any liquid precipitated from the air stream during the spraying, and this is pumped back through a pipe 36 and filter 37 by return pump 38 into the reservoir tank 31.

The duct 28 which delivers the air stream and overspray from suction hood 20 back to the inlet side 26 is of flexible material, and although shown as U-shape both in plan and elevation in FIGS. 1 and 2, can be adjusted for position depending on the usage to which the spray assembly is to be put. The support arm assembly 24 is carried on a swivel post 41 for positioning in a lateral plane, and since sometimes it is necessary to raise and lower the fan 15 in the embodiment shown, there are provided a plurality of jacks 42 to support a sub-frame 43 which carries the engine 13 and fan 15.

Figure 3:
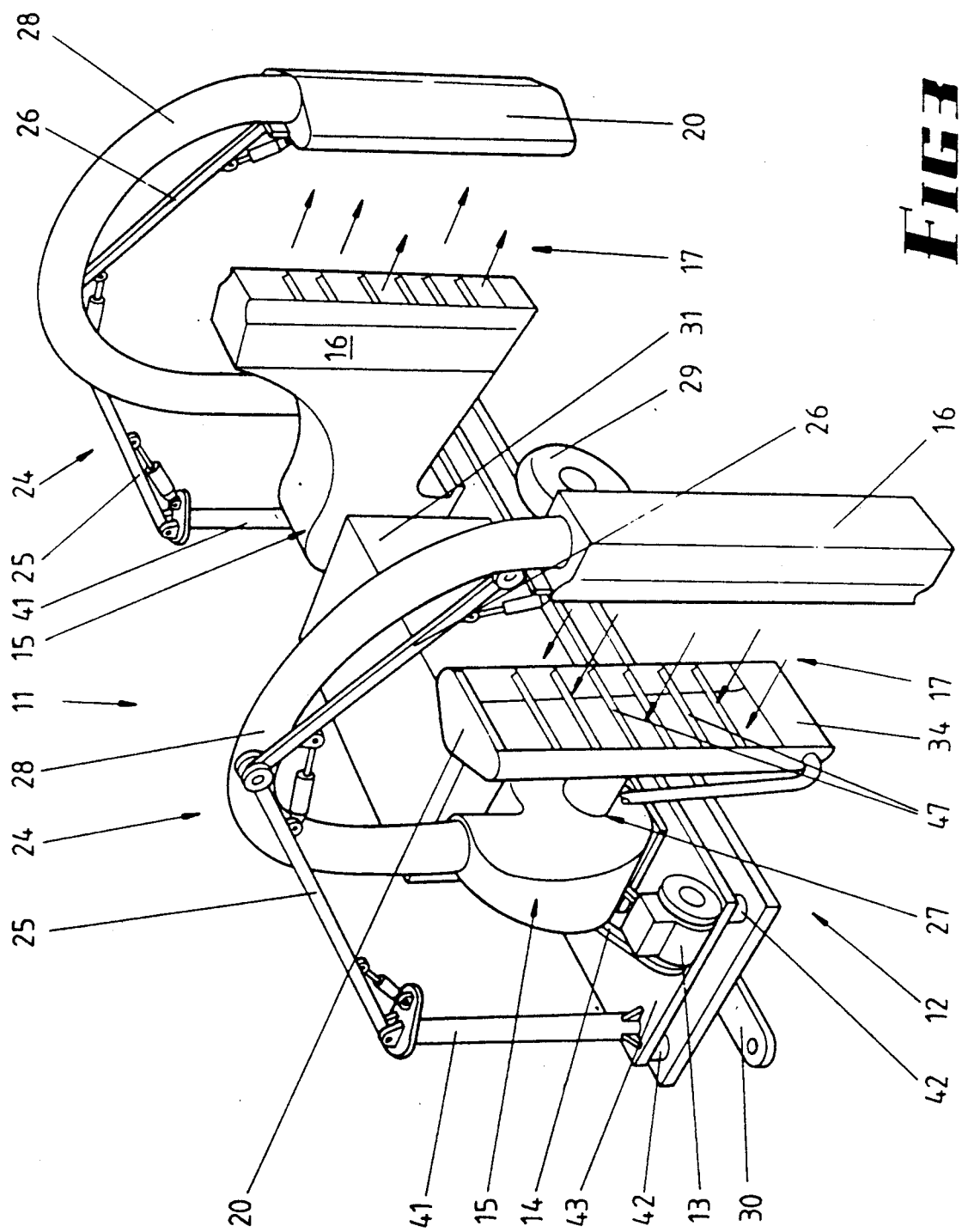
FIG. 3 is a perspective view showing a bidirectional spray arrangement which is capable of directing an airborne spray onto foliage of grape vines in the vineyard from two directions in one traverse of the spray assembly.

For most vineyard operations the assembly illustrated in FIGS. 1 and 2 is adequate without the need for reverse traverse of the spray over the grape vines 18. However there are some agricultural applications where it is desirable that both sides of a row of vines or fruit trees should be subjected to spray, with a minimum of lost overspray. FIG. 3 illustrates a single machine wherein there are two fans 15 independently driven by their respective motors 13, but the outlet side of the fan 15 (on the left hand side of FIG. 3) is connected by the delivery duct 31 to a discharge hood 16 distal from the carriage 12 so that the air stream 17 moves from the remote side of the row of vines 18 towards the suction hood 20. Thus in one traverse, both sides of the vines 18 will be subjected to an airborne spray of agricultural liquid. In other respects however the FIG. 3 embodiment is similar to the first embodiment of FIGS. 1 and 2, and similar elements bear the same designations.

Figure 4:
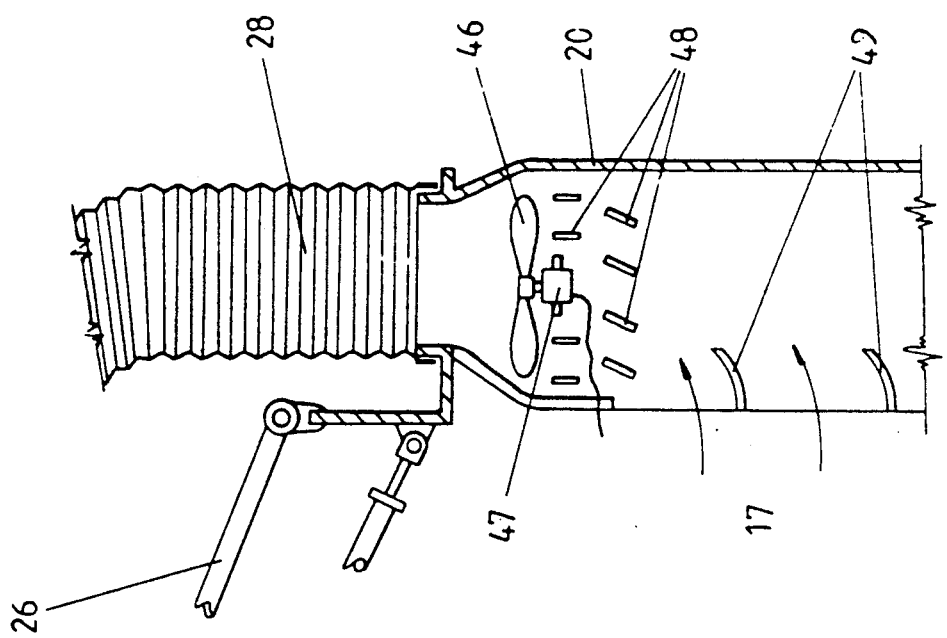
FIG. 4 is a fragmentary section showing portion of a suction hood, wherein an additional (suction) fan is used.

FIG. 4 illustrates to a larger scale, portion of a suction hood 20, which in the first embodiments would be directly connected to the intake of fan 15, but FIG. 4 illustrates an additional fan 46 driven by an hydraulic motor 47, which has the function of providing "push and pull" to the air stream 17. The air stream 17 is deflected by deflector plates 49 upwardly past baffle plates 48 before entering the duct 28, and these assist in the precipitation of the spray liquid from the overspray which is also precipitated by encountering the wall of the suction hood 20.

Figure 5:
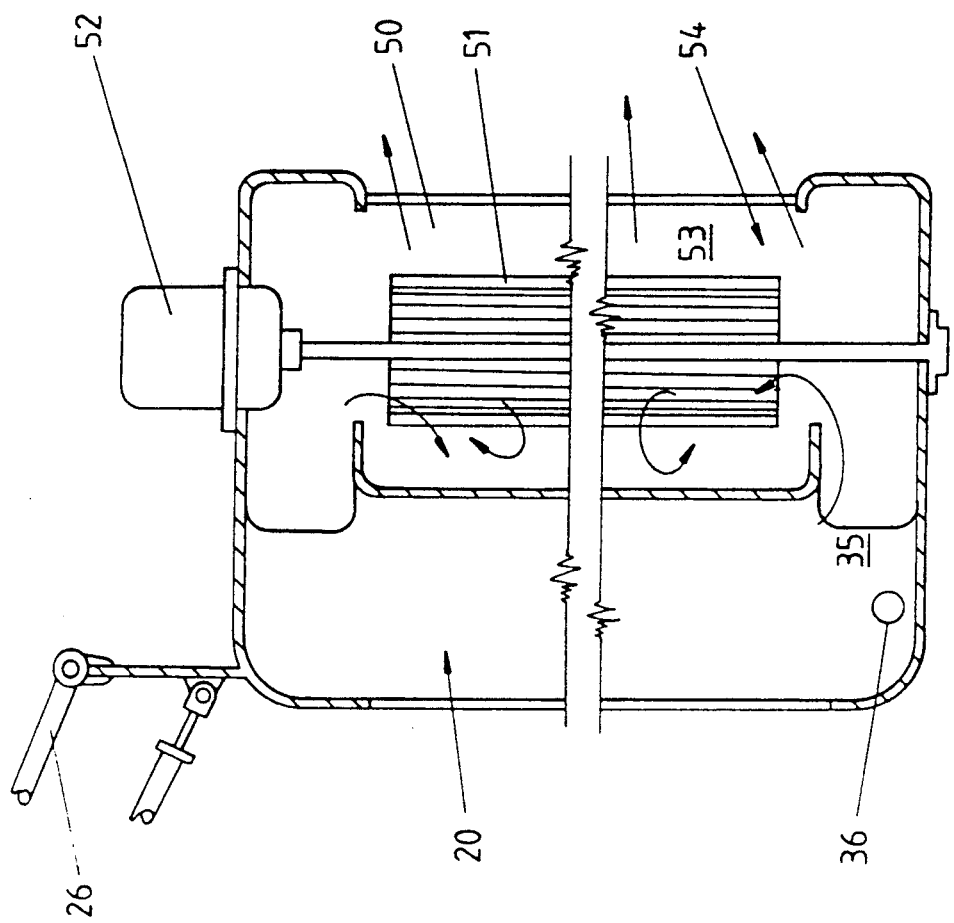
FIG. 5 is a fragmentary section of a suction hood showing use of a cyclone for precipitation of airborne overspray.

FIG. 5 shows an alternative arrangement of a suction hood 20 which is equipped with a cYclone 50, in this embodiment comprising a vertical impeller 51 driven by a motor 52 to draw air from the upper and lower portions of the hood 20, through the impeller blades as shown by the arrows, and the air swirls within the housing 53, to be discharged outwardly through the slot 54, but in the meanwhile urging the denser particles of overspray liquid against the housing walls to discharge into the sump 35 from which it is again extracted through the pipe 36 as in the first embodiment.

Figure 6:
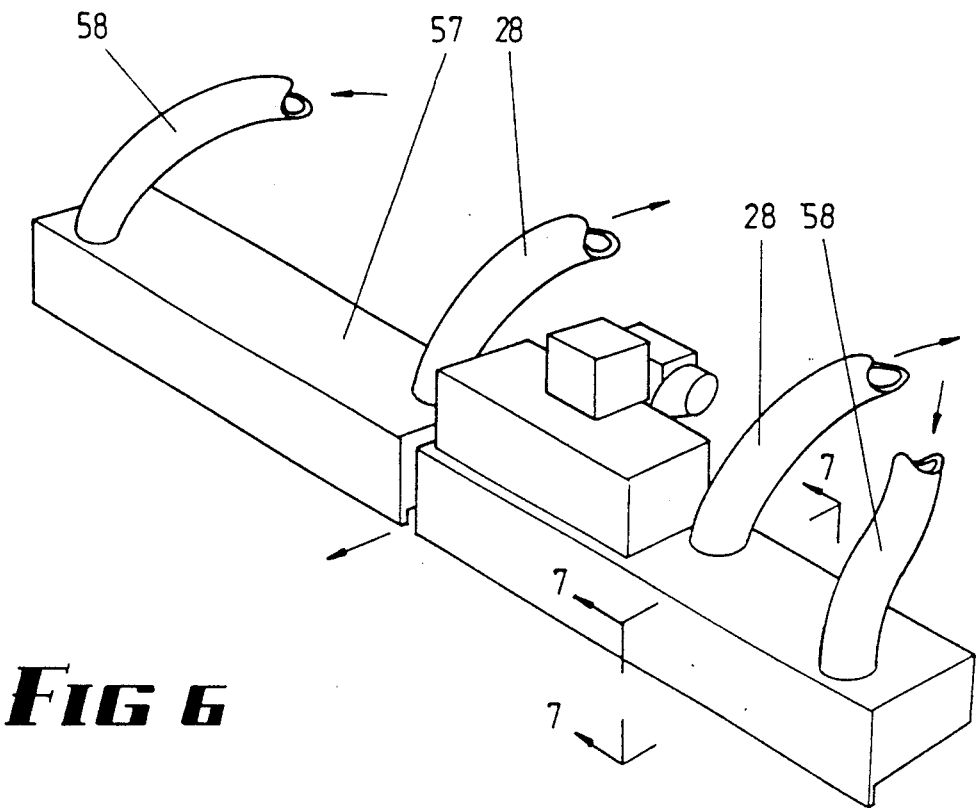
FIG. 6 is a perspective view of a "broad acre" spraying hood, useful for cereal or other low crops.

The invention is applicable to ground crops such as cereals and FIG. 6 illustrates a housing 57 which is fed with air from fans 15 through ducts 58 into plenums 59, from the crop 60, back into a suction plenum and ducts 28 into the inlet of fan 15.

Figure 7:
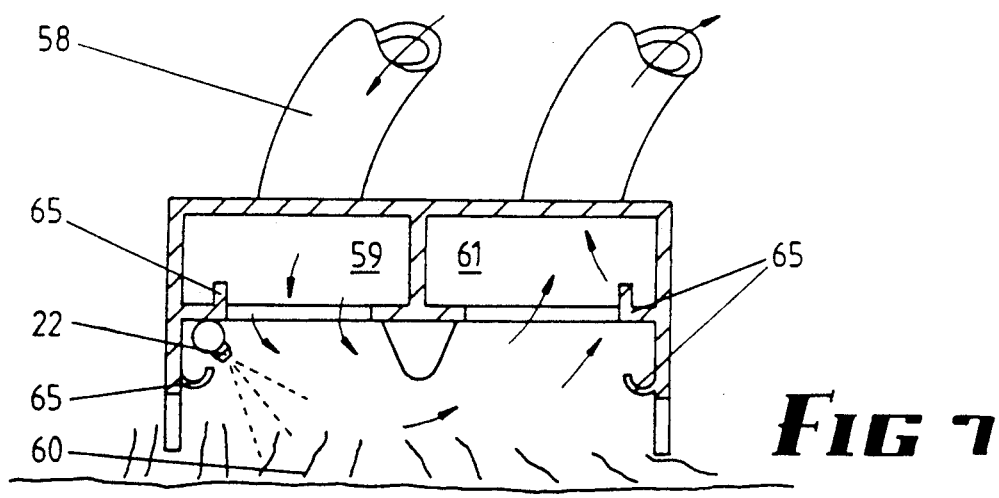
FIG. 7 is a section on line 7—7—7 of FIG. 6.
Figure 8:
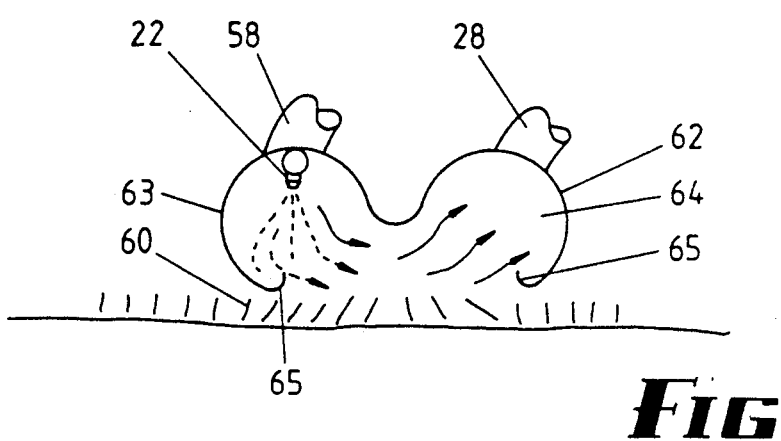
FIG. 8 is a diagrammatic section of an alternative hood.

In FIG. 8, the arrangement is similar to FIG. 7 excepting that no use is made of the plenums 59 and 61, and a single housing wall 62 has two portions 63 and 64, the air flowing from portion 63, from crop 60, and discharging from portion 64 through the duct 28 as in FIGS. 6 and 7. In both instances, however, there are provided gutters 65 which convey precipitated spray liquid back to a sump from which it is transferred to the reservoir as in the first embodiment.

Figure 9:
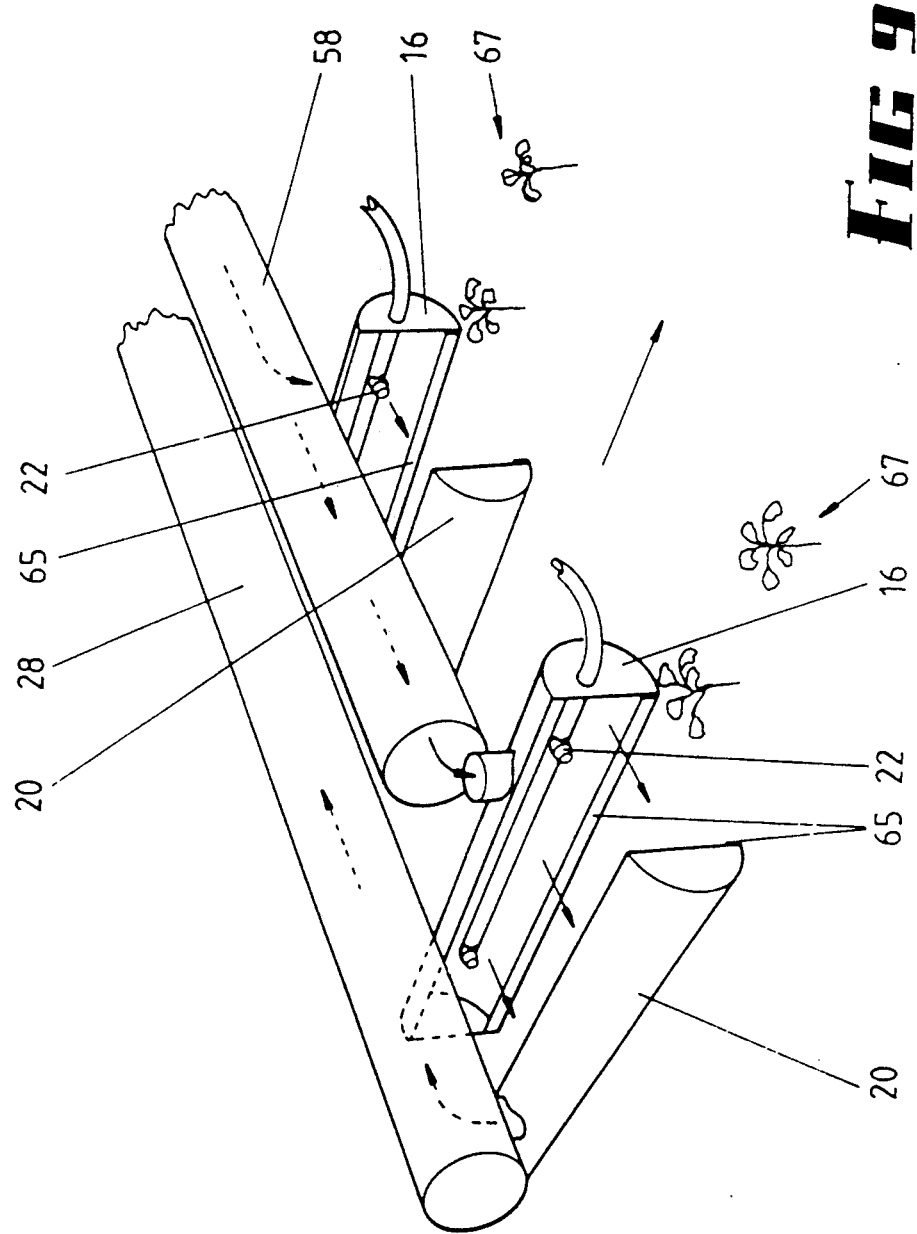
FIG. 9 shows an arrangement for cross-flow spraying of a row crop.

The invention is also useful for row crops as illustrated in FIG. 9 wherein a crop 67 of vegetables is traversed by discharge hoods 16 and suction hoods 20 spaced therefrom, and fed respectively by pressured air ducts 58 and suction ducts 28, the spray function however being the same as in the other embodiments.

Figure 10:
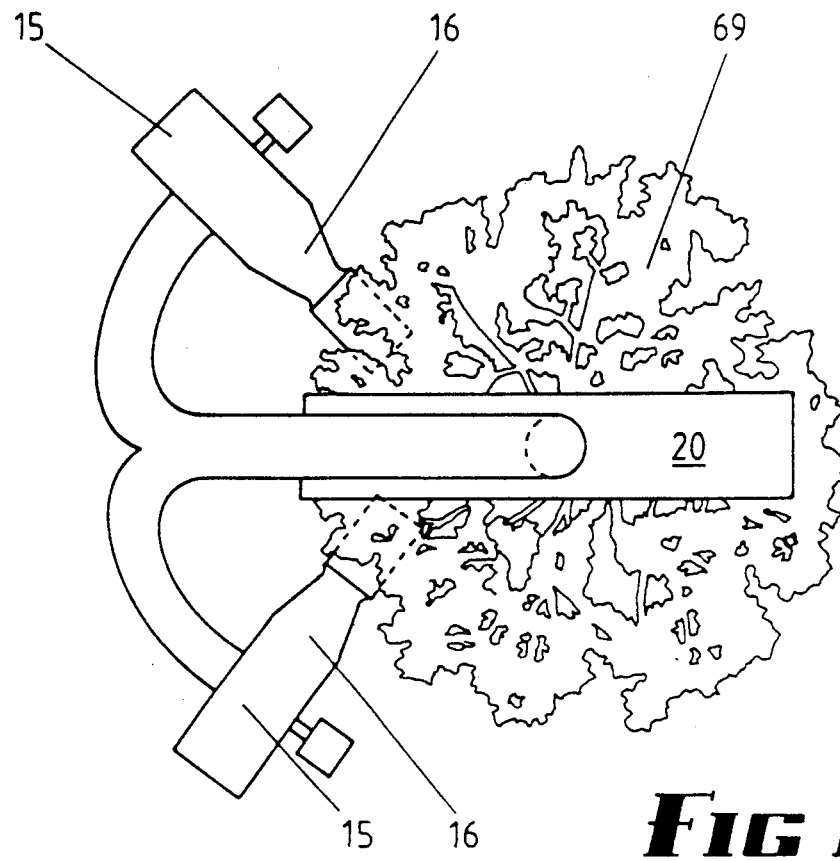
FIG. 10 is a plan view of a spray arrangement for a pome tree.
Figure 11:
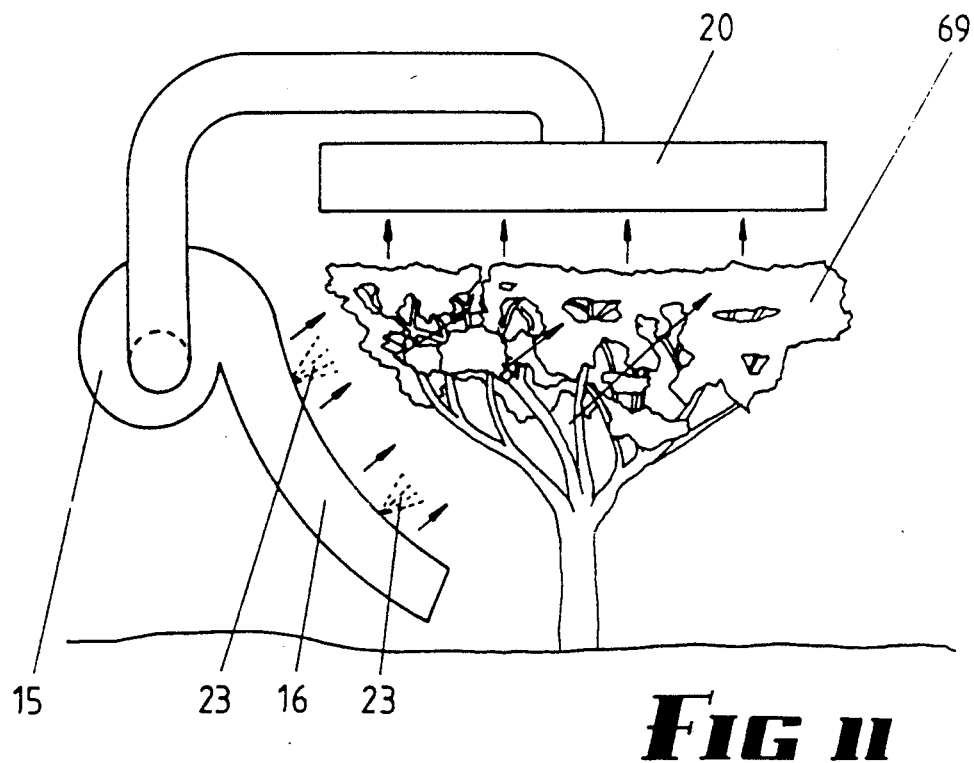
FIG. 11 is an elevation of FIG. 10.

FIG. 10 is a plan view and FIG. 11 an elevation of a pome fruit tree 69 wherein a pair of discharge hoods 16 are arranged at an angle to one another to direct the air stream 17 containing its spray 23 upwardly through the tree, and the suction hood 20 is located above the tree to return the air stream with its over spray to the fans 15, there being one fan for each respective discharge hood 16.

Alternatively to the configuration of FIG. 10, 45° emission fans may be used. Still further, the suction hood need not overlie the tree, but may be located on the lee side, as in FIGS. 1 and 2.

I claim:

1. A cross-flow spraying method for spraying a crop comprising creating an air stream with a fan, injecting an agricultural liquid spray into the air stream, passing the spray airborne by the air stream across the crop in such a manner that some of the spray adheres to the crop, establishing a low pressure in a suction hood at the lee side of the sprayed crop by recirculating some at least of the air stream to the fan, receiving some at least of airborne overspray in that suction hood, precipitating some of that received overspray liquid in the hood, and also recirculating that liquid to injection into the air stream.

2. A cross-flow spraying method according to claim 1 further comprising traversing the crop with a wheeled carriage which supports the fan and the suction hood while passing the spray across the crop.

3. A cross-flow spraying method according to claim 1 further comprising passing the air stream from the fan and through a discharge hood which contains a distribution conduit and jets, pumping the agricultural spray in a liquid form through the distribution conduit and jets, and injecting the spray from the jets into the airstream as it passes through the discharge hood.

4. A cross-flow spraying method according to claim 1 comprising pumping agricultural spray liquid from a reservoir through a conduit to spray jets and injecting that spray from the jets into the airstream, precipitating some spray liquid in the suction hood and collecting the precipitated liquid in a sump in the base of the suction hood, and pumping that collected spray liquid back into the reservoir.

5. A cross-flow spraying method according to claim 2 wherein the wheeled carriage supports two fans, passing spray airborne by a first air stream from one of said fans in one direction across the crop and receiving some at least of airborne overspray in a first suction hood at that side of the sprayed crop which is the lee side of the first air stream and subsequently passing a second spray airborne in a second air stream from the other of said fans in the opposite direction and receiving some at least of the airborne overspray in a second suction hood at that side of the sprayed crop which is the lee side of the second air stream.

6. A cross-flow spraying method for spraying a crop according the claim 1 comprising passing the air stream across the crop from one portion of a housing to an adjacent portion thereof, injecting said agricultural liquid spray into the air stream in the first said portion, and establishing said low pressure in said adjacent portion which functions as said suction hood.

7. A cross-flow spraying method for spraying a crop comprising creating two air streams with at least one fan and directing those air streams towards one another, injecting liquid agricultural spray into each air stream, passing the spray airborne by the air stream upwardly through the crop in such manner that some of the spray adheres to the crop, establishing a low pressure in a suction hood above the sprayed crop by recirculating some at least of the air stream to said at least one fan, receiving some at least of airborne overspray in that suction hood, precipitating some of that overspray in that suction hood, and recirculating that liquid to injection into the air streams.

8. A cross-flow spray assembly comprising a support frame, fan drive means and a fan coupled for drive thereto both on the support frame, air flow directing means between an outlet side of the fan and a discharge end in a position to discharge an air stream created by the fan over a crop, at least one spray jet in a position to inject spray into the air stream, a reservoir, a pump, and conduit means between the reservoir and spray jet, a suction hood, support means supporting the suction hood from the support frame in a position to receive overspray which does not adhere to foliage of the crop, a recirculating duct between the suction hood and the fan arranged to recirculate air flow into the suction hood back to the fan, a sump in the suction hood, and pump and conduit means arranged to recirculate spray liquid from the hood to the reservoir.

9. A cross-flow spray assembly according to claim 8 wherein the support frame is a wheeled carriage.

10. A cross-flow spray assembly according to claim 8 wherein said discharge end comprises a discharge hood.

11. A cross-flow spray assembly according to claim 10 further comprising a reservoir and a pump connected thereto on the wheeled carriage, and a distribution conduit in the discharge hood, said at least one spray jet being carried by the distribution conduit and oriented to inject said spray into the air stream as it traverses the discharge hood.

12. A cross-flow spray assembly according to claim 10 wherein said fan is a first fan, the assembly further comprising a second fan on the wheeled carriage, a second suction hood in communication with the air inlet side of the second fan, a second discharge hood, a delivery air duct between the outlet side of the second fan and the second discharge hood, a second recirculating duct between the second suction hood and the second fan and further support means supporting the second discharge hood in a position outboard of the carriage, the arrangement being such that the air stream created by the second fan is directed over a crop in a direction opposite the direction of the first said air stream.

13. A cross-flow spray assembly according to claim 10 further comprising walls forming a sump in the base of the (or each) said suction hood, and a return pump and conduit assembly operable to pump liquid from that sump back into the reservoir.

14. A cross-flow spray assembly according to claim 8 wherein said support means comprise height adjustment means and position adjustment means.

15. A cross-flow spray assembly according to claim 10 comprising two said fans and two said discharge hoods oriented to direct respective air streams towards each other, said support means supporting the suction hood above those air streams.

* * * * *